(12) United States Patent
Anthony

(10) Patent No.: US 7,264,352 B2
(45) Date of Patent: Sep. 4, 2007

(54) NIGHT DRIVING SPECTACLES

(75) Inventor: Romuald Anthony, 2661 Tallant Rd. Apt. #MW-526, Santa Barbara, CA (US) 93105

(73) Assignee: Romuald Anthony, Santa Barbara, CA (US)

( * ) Notice: Subject to any disclaimer, the term of this patent is extended or adjusted under 35 U.S.C. 154(b) by 29 days.

(21) Appl. No.: 11/255,431

(22) Filed: Oct. 20, 2005

(65) Prior Publication Data

US 2007/0091251 A1 Apr. 26, 2007

(51) Int. Cl.
*G02C 7/10* (2006.01)
*G02C 7/16* (2006.01)

(52) U.S. Cl. .......................... 351/165; 351/45
(58) Field of Classification Search ................ 351/165, 351/44, 45
See application file for complete search history.

(56) References Cited

U.S. PATENT DOCUMENTS 2,875,670 A * 3/1959 Thornton ................. 351/45

* cited by examiner

*Primary Examiner*—Scott J. Sugarman
(74) *Attorney, Agent, or Firm*—Michael G Petit; Laura N Tunnell

(57) ABSTRACT

Spectacles for reducing glare due to oncoming traffic while driving at night. The spectacles include a mask or filter that blocks light from entering the wearer's eyes when the source of light is on the opposing side of the highway. The mask may either be a part of the lenses of the spectacles or supported in front of the spectacle lenses by means of a "clip-on" device. If a perpendicular reference line is drawn on the lenses that passes through the optical center of the lens, the mask covers the portion of the lens between ~225° and 15° with respect to the perpendicular (or the mirror image on British-type highways), or, with reference to the face of a clock, the portion of the lens between 7:30 and 12:30. The mask can be opaque, or it can be a low transmissivity filter (transmissivity ~10%) or a notch filter that passes only red light. The angle from which oncoming light can be blocked my be changed by a slight rotation of the wearer's head.

5 Claims, 2 Drawing Sheets

A°=B°=C°

A°=B°=C°

NIGHT DRIVING SPECTACLES

BACKGROUND OF THE INVENTION

1. Field of the Invention

The present invention relates to spectacles for reducing glare from the headlights of oncoming traffic while driving at night.

2. Prior Art

The current popularity of SUV's and pick-up trucks, with headlights higher then is normal for typical sedans, are a hazard during driving at night. The oncoming headlights on a roadway shine directly into the eyes of the driver of a sedan. This brief intense light source causes a momentary blindness and discomfort for approximately 3-5 seconds. During that period of uncertainty the driver's view of a curve in the road ahead, or any other unlighted vehicle, object, cyclist or animal in the road before him is impaired and an accident may ensue. Often the police will attempt to attribute the cause of a rollover or accident to alcohol or drug content in the driver's blood. When subsequent measurement indicate no sign of either alcohol or drugs in the driver's blood, the accident is attributed to "unknown causes". Yet this driver may have experienced the aforesaid temporary blindness from the glare of headlights on an oncoming vehicle. As the use of higher intensity Xenon and blue headlights become more common, the problem is increasingly in severity. It has been reported that there is an increase in 'driver eye fixation' on these new high intensity lights relative to the older tungsten headlights.

It is desirable to block or reduce the intensity of oncoming vehicle headlights while retaining normal viewing capability in the visual field to the right of the roadway center dividing lines and in the direction one is driving. Any form of night glasses using filter coating which covers the visual field ahead may help reduce the oncoming headlight intensity, but they also reduce the brightness of the forward driving field ahead. Any reduction in the original brightness results in a decrease in contrast sensitivity of the eye in that field. It is particularly true if the road ahead is relatively dark and brightness levels are in the order of 0.3 millilamberts. Consequently the driver is not using the full capability of his/her eyes during night driving when the driver needs them the most.

To overcome the problems associated with glare from oncoming traffic, a number of night driving glasses have been disclosed in the prior art. Examples of prior art attempts to provide night driving glasses include U.S. Pat. Nos. 5,252,997 and 6,113,233. Kelly, in U.S. Pat. No. 2,511,776, discloses a pair of spectacles having lenses wherein the upper half of each lens is translucent and the lower half transparent. An inverted "V—shaped" notch in the lower edge of the translucent portion is claimed to block light from oncoming traffic but permit viewing of the driver's lane immediately ahead of the vehicle, but it also reduces the overall brightness of the field ahead. The arrangement is also purported to block headlights from following traffic. A disadvantage of the arrangement is that due to the dimensions of the notch, it does not permit clear viewing of the road ahead to the horizon in full brightness while blocking the oncoming headlights. There is a continuing need for night driving glasses that reduce glare from oncoming headlights yet do not reduce light intensity within the field of view of the driver that is required for safe driving.

SUMMARY

The present invention is directed to a pair of night driving spectacles for reducing glare from headlights of oncoming traffic that substantially obviates one or more of the limitations of the related art. To achieve these and other advantages and in accordance with the purpose of the invention, as embodied and broadly described herein, the invention includes a masking member disposed on or in front of the respective lenses of a pair of spectacles in accordance with a particular geometry set forth hereinbelow.

The spectacles of the present invention reduce glare from the headlights of oncoming traffic while driving at night. The spectacles generally comprise left and right lenses supported by a wearable frame. The left and right lenses each have a lens plane and an optical center. If an imaginary line connecting the respective optical centers of the lenses defines an x-axis, and an imaginary line passing through each optical center perpendicular to the x-axis in the lens plane defines a y-axis, the x-axis and y-axis collectively define a polar coordinate system. A chord drawn on each lens between 225° and 15° with respect to the coordinate system partitions each lens into a smaller masked portion and a larger transparent portion. A masking material is coated on, or affixed to the masked portion of each lens. The masking material preferably has an optical transmissivity between zero and about 10%.

The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENTS

Figure 1:
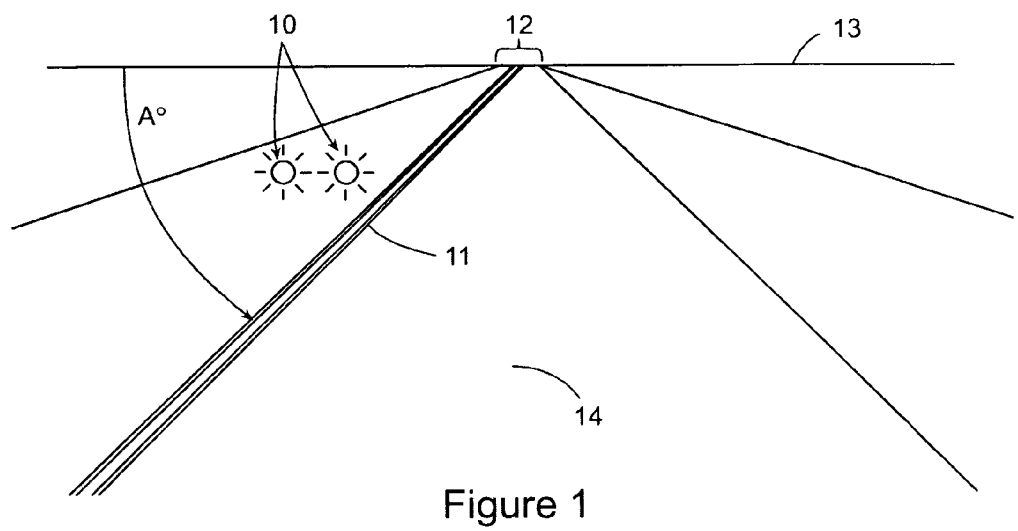
FIG. 1 is a perspective view of a highway having a center divider as viewed by a driver.

Turning first to FIG. 1, an approaching vehicle having illuminated headlights 10, traveling toward a driver (not shown) on a US highway, is shown from the driver's point of view. The centerline 11 of the highway 12 is seen to merge into the horizon 13. The driver's lane is indicated at numeral 14. The centerline 11 is seen to intersect the horizon 13 at an angle A° when viewed from the driver's point of view.

Figure 2:
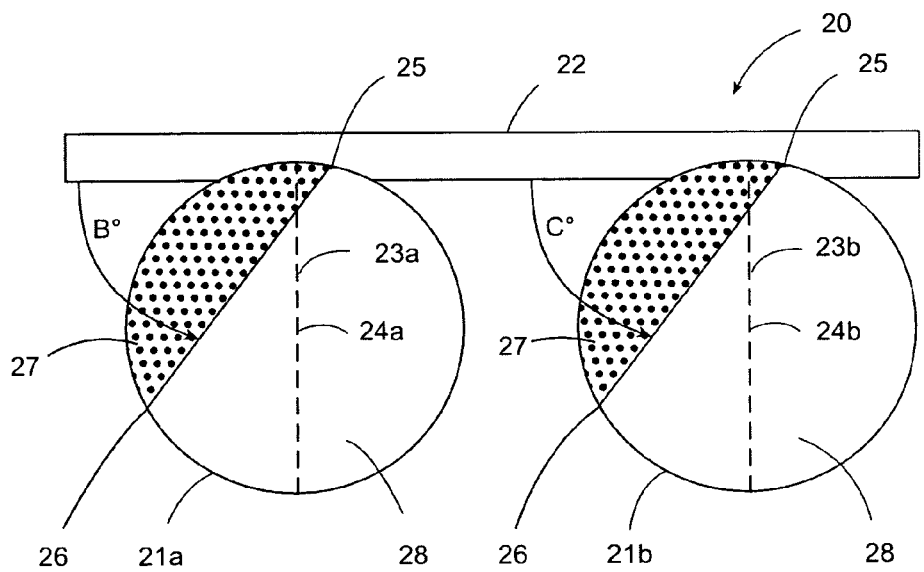
FIG. 2 is a rear plan view of night driving spectacles in accordance with the present invention illustrating the position of the left and right masks disposed on or in front of the respective spectacle lenses (for use on US highways).

Turning next to FIG. 2, a pair of night driving glasses in accordance with the present invention is indicated at numeral 20. The spectacles 20 include a pair of lenses 21a and 21b supported by a wearable frame 22. The temples of the frame have been omitted for clarity. A pair of imaginary (dashed) lines 23a and 23b are shown drawn through the optical centers 24a and 24b of the respective lenses such that they are perpendicular to the horizon 13. A line drawn from the optical center of each lens at 15° and 225° with respect to the perpendicular lines 23a and 23b intersects the periphery of the lens 21a and 21b at point 25 and 26 respectively. A chord drawn between points 25 and 26 partitions each lens into a masked portion 27 (stippled) and a transparent portion 28. The respective chords make respective angles B° and C° with respect to the horizon 13 wherein A°=B°=C°.

Figure 3:
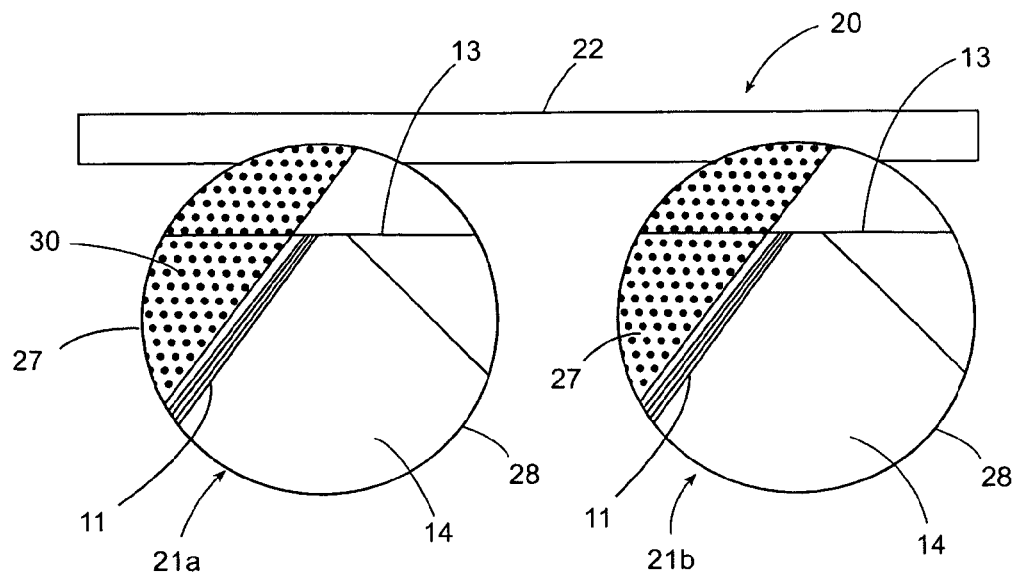
FIG. 3 illustrates the driver's view of a US highway when wearing spectacles in accordance with FIG. 2.

A pair of spectacles 20 in accordance with FIG. 2 are shown in FIG. 3 with a masking material 30 attached to, or supported in front of, the masked portions 27 of the respective lenses 21a and 21b. The masking material 30, indicated by stippling in the masked portion 27 of the lenses, is preferably a neutral density filter that has a transmissivity of about 0-10%. The effect of the masking material 30 is to block substantially all of the glare of the oncoming headlights 10 (FIG. 1) from opposing traffic (i.e., traffic traveling in the direction of the viewer on the opposing side of the centerline 11). If the driver does not require corrective lenses for driving, a pair of spectacles having lenses with zero correction and the masking material affixed thereto in accordance with the above-described geometry is sufficient to reduce glare while driving at night.

Figure 4:
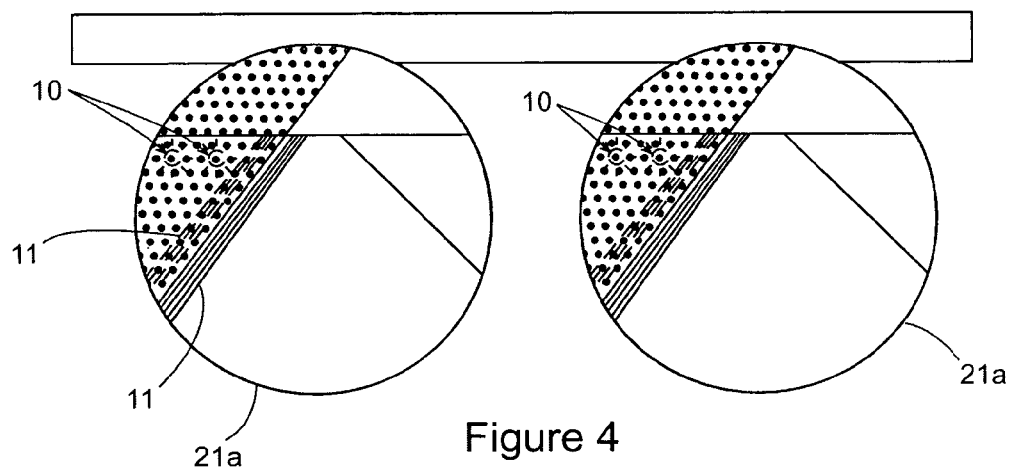
FIG. 4 illustrates the driver's view of a US highway when wearing spectacles in accordance with FIG. 2 with the head faced forward (solid lines) and with the head rotated slightly to the right (dashed lines in FIGS. 4 and 5).
Figure 5:
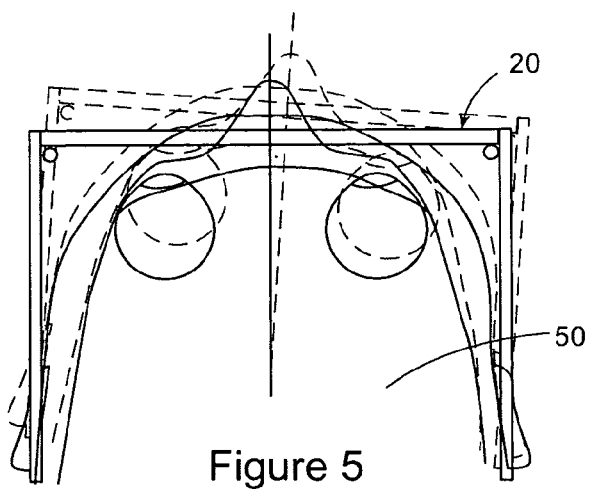
FIG. 5 is a top view of a driver's head faced directly forward (solid lines) and rotated slightly to the right (dashed lines) to generate views as illustrated in solid and dashed lines respectively in FIG. 4.

For those who must wear corrective spectacles for driving, a pair of "clip-on" correction-free lenses having masking material affixed to the masked portion of the lenses as described above may be attached to the prescription spectacles in a manner similar to that used in the prior art for attaching "clip-on" sunglasses to spectacles for daylight driving. When driving on British-style roads, the masked portion 27 of the left 21a and right 21b lenses is the mirror image of the masked portion 27 of the respective lenses employed for driving on American roads. p With reference now to FIGS. 4 and 5, it is apparent that by simply rotating the head 50 (dashed lines in FIG. 5) slightly to the right (in the case of American traffic), the straight edge of the filtered section (i.e., the chord) will cut across the center dividing lines 11 which can mask the centerline 11 as shown in phantom in FIG. 4. The extent and need for head rotation is determined by the driver for his/her comfort. With the driver's eyes looking straight down the road ahead, the driver sees clearly his/her side of the road ahead, including the centerline, through the clear section of the glasses, but the glare from headlights 10 of oncoming traffic is reduced by the masked portion of the lenses. If there is no oncoming traffic, the position of the driver's head is preferably straight ahead as shown by the solid lines as indicated in FIG. 4.

When there is no oncoming traffic, or the headlights of oncoming traffic do not present a vision problem, the driver may rotate his/her head slightly to the left to view both sides of the centerline. Accordingly, under some driving conditions the driver may view the entire road ahead through the transparent portion 14 of the lenses. This provides the driver with a clear view and maximum brightness of the road ahead at night when it is the most important. As oncoming lights appear, the driver merely rotates his/her head to the right to shield the pupils from the glare of the oncoming lights.

In most prior art night driving spectacles the visual field in the direction of travel of the driver is partially or entirely covered by a filter to provide headlight protection. This characteristic reduces the contrast in the field ahead and to the right of the center dividing lines in the roadway where he/she needs to maintain maximum vision. For example a cyclist with no lights or reflectors, a deer or other object in the roadway are only marginally visible using such prior art spectacles. Night driving spectacles made in accordance with the present invention as described above maintain vision and contrast in the driver's lane of travel.

While particular embodiments of the present invention have been illustrated and described, it would be obvious to those skilled in the art that various other changes and modifications can be made without departing from the spirit and scope of the invention. For example, it is obvious that for British-style highways, the masked portion of the respective lenses will be the mirror image of the masked portion of spectacles 20 used on American highways. In the event of a multilane highway, if the driver is in the right lane, it may be desirable to use a red pass filter for the masking material to enable the driver to clearly see the (red) taillights or brakelights of traffic ahead that is traveling in the same direction as the driver, but in the left (fast) lane. Further, the frame 22 may be an adjustable type wherein the spacing between the optical centers 24a and 24b of the lenses 21a and 21b can be changes in order to accommodate various interpupillary distances. It is therefore intended to cover in the appended claims all such changes and modifications that are within the scope of this invention.

What I claim is:

1. Spectacles for reducing glare from headlights of oncoming traffic while providing a wearer of the spectacles with a clear view of a road ahead while driving at night, the spectacles comprising:
    (a) a wearable frame operable for supporting left and right lenses;
    (b) left and right lenses affixed to said frame, said left and right lenses having a lens plane and an optical center, and wherein an imaginary line connecting said optical centers of said lenses defines an x-axis and an imaginary line passing through said optical center perpendicular to said horizontal line in said lens plane defines a y-axis, said x-axis and said y-axis collectively defining a polar coordinate system, and wherein an imaginary chord drawn on the lens between 225° and 15° partitions said lens into a smaller masked portion and a larger transparent portion;
    (c) a masking material affixed directly to said masked portion of said lenses, said masking material being coextensive with said masked portion and having an optical transmissivity between zero and about 10%.

2. The spectacles of claim 1 wherein said optical transmissivity of said masking material is about 10%.

3. The spectacles of claim 1 wherein said frame includes adjustment means operable for changing a distance between said optical centers of said lenses.

4. The spectacles of claim 1 wherein said masking material is a red pass filter.

5. Spectacles for reducing glare from headlights of oncoming traffic while providing a wearer of the spectacles with a clear view of a road ahead while driving at night on a British-type road, the spectacles comprising:
    (a) a wearable frame operable for supporting left and right lenses;
    (b) left and right lenses affixed to said frame, said left and right lenses having a lens plane and an optical center, and wherein if an imaginary line connecting said optical centers of said lenses defines an x-axis and an imaginary line passing through said optical center perpendicular to said horizontal line in said lens plane defines a y-axis, said x-axis and said y-axis collectively defining a polar coordinate system, a chord drawn on the lens between 345° and 145° partitions said lens into a smaller masked portion and a larger transparent portion;

(a) a masking material affixed directly to said masked portion of said lenses, said masking material being coextensive with said masked portion and having an optical transmissivity between zero and about 10%.

* * * * *